Oct. 24, 1961  D. D. LANG ET AL  3,005,739
METHOD AND APPARATUS FOR MAKING MULTI-CONDUCTOR CABLE
Filed April 29, 1957  2 Sheets-Sheet 1
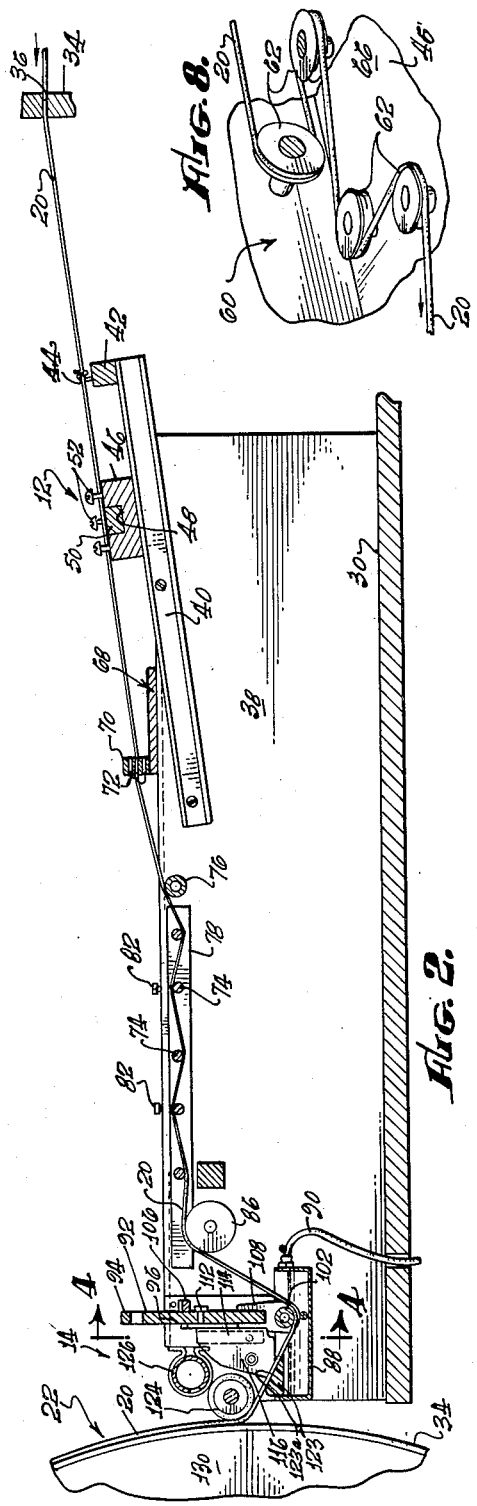
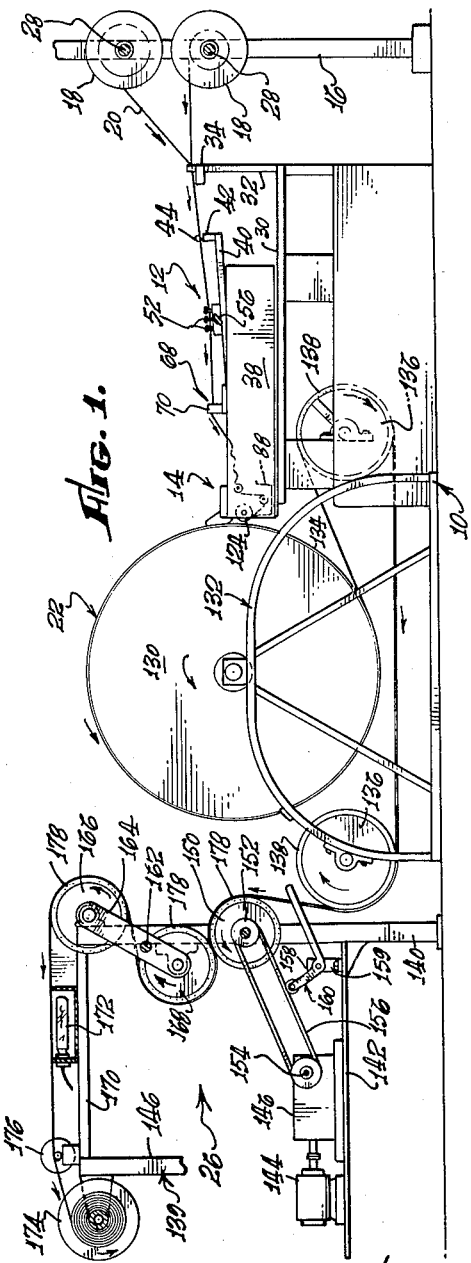
JOHN FLORD,
DONALD D. LANG,
INVENTORS.
By Fulwider, Mattingly & Huntley.
ATTORNEYS.

Oct. 24, 1961     D. D. LANG ET AL     3,005,739
METHOD AND APPARATUS FOR MAKING MULTI-CONDUCTOR CABLE
Filed April 29, 1957     2 Sheets-Sheet 2
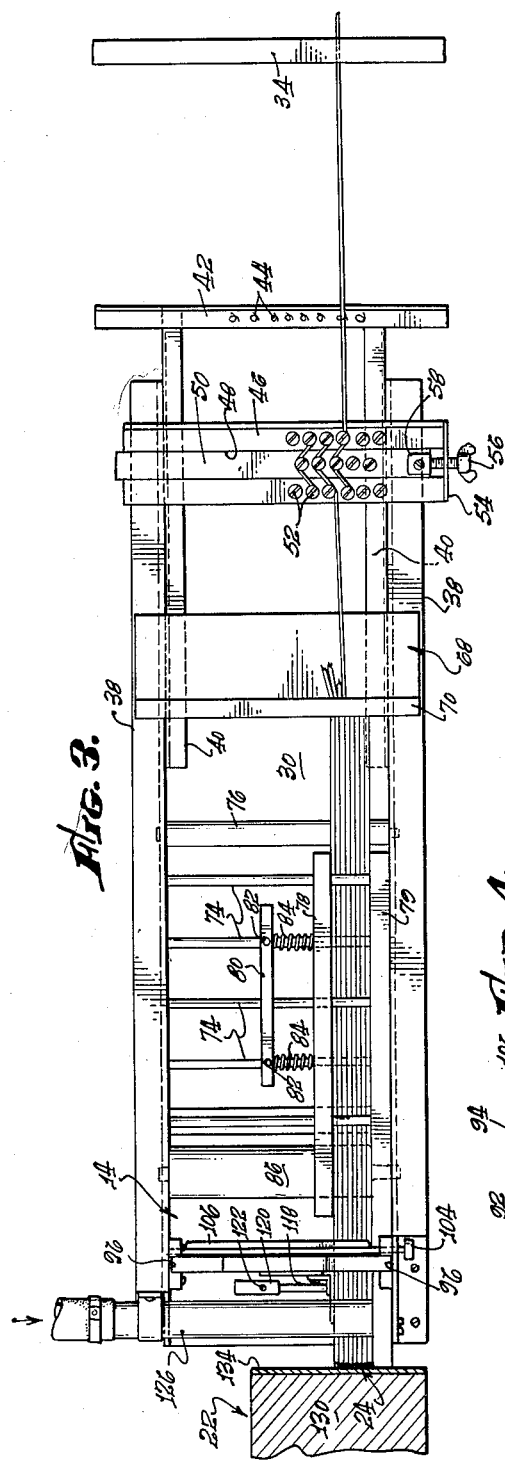
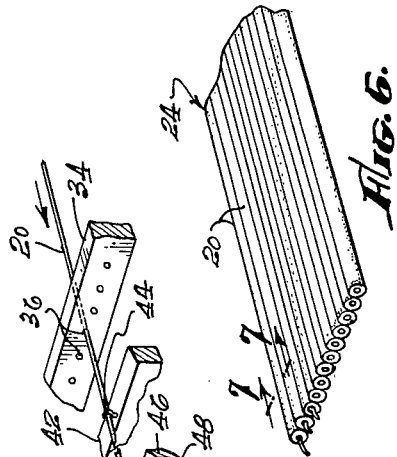
INVENTORS:
JOHN FIORD,
DONALD D. LANG,
By Sulwider, Mattingly & Huntley
ATTORNEYS.

United States Patent Office 3,005,739
Patented Oct. 24, 1961

3,005,739
METHOD AND APPARATUS FOR MAKING MULTICONDUCTOR CABLE
Donald D. Lang, 10061 Aldgate Ave., and John Ford, 8841 Orangewood Ave., both of Anaheim, Calif.
Filed Apr. 29, 1957, Ser. No. 655,625
6 Claims. (Cl. 156—47)

The present invention relates generally to electrical harness or cable and particularly to a flat band harness and a method and apparatus for producing same.

A flat cable of individually insulated conductors has unusual advantages in that it is space-saving and when properly colored-coded speeds assembly and routing in complex wiring networks.

In order to obtain these advantages, the individually insulated conductors must be combined and retained in contacting side-by-side relationship during handling and placement of the multi-conductor cable in the network, and further, must be capable of being readily separated or "pealed-off" from adjacent conductors in the cable unit. The term "peel-off bond" is defined hereinafter as that type of slight adhesion or approximately tangential fusion between adjacent insulated conductors which enables the multi-conductor cable unit to have a reasonable degree of stability during handling and placement such as to prevent separation of the cable into individual conductors, while, at the same time, enabling a ready peel-off or stripping of a conductor or section of the conductors from the remainder of the cable, when desired. The term "peel-off cable" as used hereafter will refer to a cable in which adjacent conductors of a multi-conductor cable are joined by a "peel-off bond."

Polyvinyl coatings in general and polyvinyl chloride (PVC) compounds specifically have been employed in the past as coverings or coating for conductors. In general, such coatings are both highly insulative and chemically resistant. While it is highly desirable to produce a peel-off multi-conductor cable in which each conductor has (PVC) insulated coating, such processes have, to my knowledge, not existed hitherto.

Accordingly, it is a major object of our invention to provide a method of joining a plurality of individual polyvinyl insulated conductors into a multi-conductor cable.

It is another major object of the present invention to provide a process for producing a peel-off multi-conductor cable, in which each conductor of the cable is insulated from the other.

It is another object of the present invention to provide a continuous process for combining a plurality of polyvinylchloride coated conductors to form a peel-off multiconductor cable.

Still another object of the invention is to provide a continuous process for producing a peel-off multi-conductor cable, each conductor in the cable having an outer covering of polyvinylchloride, and an inner layer of a dissimilar insulator.

It is a further object of the present invention to provide a process for combining a plurality of polyvinylchloride covered conductors to form a flat peel-off cable wherein the polyvinylchloride outer layer of each conductor is approximately tangentially fused to adjacent conductor by a controlled solvent action.

Another object of our invention is to provide an apparatus for continuously producing a flat band of multiconductor cable from a plurality of individual insulated conductors.

A further object of our invention is to provide an apparatus that is particularly adapted for joining several insulated conductors into the form of an integral flat band multi-conductor cable by means of solvent action upon the conductor insulation.

These and other objects and advantages of our invention will be apparent from the following description thereof when taken in conjunction with the attached drawings in which:

FIGURE 1 is a side elevation of apparatus embodying our invention;
FIGURE 2 is a partial vertical sectional view of a portion of the apparatus shown in FIGURE 1;
FIGURE 3 is a top plan view of the portion of the apparatus shown in FIGURE 2;
FIGURE 4 is a transverse sectional view taken on the lines 4—4 of FIGURE 2;
FIGURE 5 is a partial perspective view of the conductor straightening and guide means of the apparatus shown in FIGURE 1;
FIGURE 6 is a perspective view of a flat band multiconductor cable formed in accordance with our invention;
FIGURE 7 is a sectional view taken on the line 7—7 of FIGURE 6; and
FIGURE 8 is a partial perspective view of an alternate form of conductor straightening device for use with our apparatus.

The most advantageous form of the process is one in which the cable is produced in a flat band, although as will be seen, other configurations may also be produced. In general, the process for producing a peel-off multiconductor cable from a plurality of separate PVC covered conductors comprises the main steps of:

(1) Aligning the PVC coated conductors is contacting side-by-side relationship;
(2) Maintaining the conductors under tension;
(3) Passing the thus-aligned tensioned conductors into a solvent bath maintained at a specified temperature and pressure;
(4) Exposing the conductors to the solvent action of the bath for a controlled period of time, the thus-controlled action of the bath fusing the individual PVC conductors to create the requisite peel-off bond; and
(5) Evaporating the solvent remaining on the fused conductors.

The terms "fusing, fusion" and the like are referred to herein as a softening of adjacent individual thermoplastic PVC-containing materials by solvent action so that these materials combine to form an integral mass upon drying (evaporation of the solvent). The terms "fusing, fusion" and the like are not used in the usual chemical sense, a melting due to application of heat.

Referring now to each of the process steps specifically, a PVC covered wire is preferably employed as the conductor. It has been found that high molecular weight PVC resinous coatings have lower flammability than low molecular weight PVC resins, and the high molecular weight PVC resin is therefore preferably employed as the conductor coating.

A typical PVC covering which will withstand 105° C. temperatures without adverse effects, has the following composition:

| | Parts |
|---|---|
| High molecular weight PVC resin | 50 |
| Plasticizer, e.g. dioctylphthalate | 35 |
| Stabilizers: | |
|     Light-phosphate type | 1.0 |
|     Heat-lead type | 4.0 |
| Filler, e.g., calcium carbonate | 9.0 |
| Lubricant | 1.0 |
| Total | 100.0 |

The actual PVC resin content in the above PVC covering composition is 50 percent. However, the PVC covering has both an upper and a lower limit with respect to the PVC resin concentration that should be present in the insulator composition. The upper limit of resin concentration is approximately 60 percent resin, this upper limit being determined by the fact that above this concentration the PVC coating becomes exceedingly rigid. The lower limit of PVC resin concentration is about 40 percent below this PVC resin concentration, the covering lacks the required durability and wear resistance.

The PVC covering may be extruded directly onto the bare wire conductor or may be extruded, or otherwise applied, to a precoated wire. The precoating materials are of dissimilar plastic compositions, such as, for example, polyethylene nylon and Teflon (tetrafluoroethylene).

After obtaining the proper side-by-side alignment and tensioning of individual PVC insulated conductors, by apparatus means which will be described hereafter, the conductors are passed into a solvent bath, the purpose of which is to lightly fuse them by solvent action alone.

The problem of finding an acceptable solvent bath for production purposes was not readily solved. It is generally accepted that ketones, such as cyclahexanone and methylethyl ketone, and esters are solvents for the PVC resins. However, the high molecular weight PVC resins are, in fact, not readily soluble in these classes of organic compounds, and in order for the PVC solubility rate to be sufficiently high to achieve the desired fusion at a high rate of production, the ketone and ester solvents must be heated. The heating of such solvents, however, has certain disadvantages; for example, the fumes of many of the ketones and esters are irritating to the mucous membranes or are toxic to human beings. Further, they may create a fire hazard.

On the other hand, it has been found that a bath of tetrahydrofuran (THF) maintained at room temperature and at atmospheric pressure has a practically instantaneous softening effect on high molecular weight PVC coatings and imparts the required solvent action for slight or tangential fusion of the individual PVC conductors and for the rapid production of a peel-off multiconductor cable.

The actual contact time between the THF and the high molecular weight PVC conductors (having 40–60% PVC resin) must be kept within narrow limits. If the contact time is less than about 0.45 second at the temperature and pressure above specified, little or no fusion of the PVC insulated conductors is obtained. If, at the other extreme, the contact time of 1.0 second is exceeded, too high a degree of fusion is obtained with the end result that the insulated conductors do not retain their individual identity and become rather one indefinite mass.

The optimum contact time is found to be between 0.60 and 0.75 second. At the optimum contact time, the individual PVC coated conductors become substantially tangentially fused, that is, acquire an approximately linear joining whereby they retain their individual identiy for ready stripping or peel-off when desired. Such a tangential fusing is illustrated in FIGURE 7. At optimum contact time the limited fusion obtained between adjacent conductors is nevertheless sufficient to allow handling and placement of the conductor cable without separation of the individual conductors.

It will be appreciated from the foregoing that the limitation on the speed of the process of making multi-conductor cable is essentially chemical in nature rather than mechanical.

In the presently preferred operation, the band of unfused conductors have a three-inch passage through the THF bath, the speed of passage of the conductor band being between 15 and 35 feet per minute. The optimum speed of passage of the conductors is found to be between 20 and 25 feet per minute.

Immediately upon withdrawal of the fused conductors or cable from the solvent bath, the solvent remaining upon the cable is dried or evaporated, usually by the application of heat. Thus, the cable can be wound practically immediately after withdrawal without danger of a fusing of adjacent wound bands of cable.

As has been stated previously, the amount of PVC resin employed in the PVC coating is preferably between 40 and 60 percent. Sometimes, however, a PVC coated wire is required to be coated that has a lesser amount of PVC resin, for example, from 25 to 40 percent. It has been found that, in such cases of a low grade PVC coated conductor, adding one tenth to three percent of the PVC resin (depending upon the PVC resin concentration of the PVC coating) to the THF results in a substantial toughening or increase in durability of the original PVC coating along with the simultaneous production of the multi-conductor peel-off cable. The disadvantage of such minor additions of PVC resin to the THF is the increase in viscosity of the THF bath which adversely affects rate of throughput of the conductors. However, such a process disadvantage is usually offset by the increase in quality of the coating.

Having described a process for production of a multi-conductor peel-off cable, one preferred embodiment of the apparatus for practicing the process of my invention will now be described.

In general, the presently preferred apparatus includes means for supporting several spools of conductors that unwind in response to uniformly tensioned movement of the conductors through the apparatus. Suitable guides are provided through which the conductors are fed and gathered into a substantially flat band after passing through a wire straightening device. As a result of passing through the wire straightening device, any bending strains induced in the conductors by virtue of having been wound on a spool are removed. The straightened wire is then fed into means for firmly folding the conductors in contiguous alignment, i.e., with their adjacent surfaces in intimate contact.

The several conductors having thus been gathered into the desired flat band configuration, the band is then guided through a tank containing the THF solvent for fusing the conductors into cable form. Simultaneously with exposure of the conductors to the solvent, the band is subjected to slightly laterally opposed pressures that hold the conductors into intimate contact.

The conductors are pulled through the apparatus at a substantially constant speed of a predetermined rate thereby subjecting the conductors to immersion in the THF solvent bath for the required length of time to achieve the fusing thereof. As the fused band leaves the solvent bath it is subjected to a stream of air, preferably warm, to hasten drying or evaporation of the solvent remaining on the band. The tensioned cable is then laid onto a slowly revolving large diameter drum on which one side of the cable dries as the drum turns through part of a revolution. The cable then passes onto a series of spaced-apart rollers adapted to expose both sides of the cable to the atmosphere for drying. At least one of these rollers is drivingly engaged by a prime mover and is biased against an adjacent roller and the cable passes between these two rollers to provide the force for pulling the conductors through the apparatus. During the drying step the conductors are not laterally confined, but due to the aforementioned straightening operation any bending stresses therein have been removed so that the conductors will have no tendency to spring apart during drying. After drying, the completed flat band cable is wound onto appropriate spools.

Referring now to the drawings for the general arrangement of our cable forming apparatus and referring particularly to FIGURE 1, an elongated base 10 supports conductor guide and straightening means 12 and solvent applying means 14. A rack 16 for supporting a plurality of spools 18 is positioned at the input end of the base 10, i.e. to the right as viewed in FIGURE 1. PVC insulated conductors 20 are unwound from spools 18 and pulled through the guide and straightening means 12 and solvent applying means 14 and passed on in cable form to a drying assembly 22 located at the output end of the base 10. From the drying assembly 22, the completed flat band cable 24 goes to a wind-up and pulling mechanism, indicated generally by the numeral 26.

The rack 16 may be of any conventional construction and is preferably adapted to support a plurality of horizontally disposed vertically spaced shafts 28, each of which supports a plurality of freely rotatable spools 18. Ordinarily, all of the conductors 20 in a cable 24 will be of the same gauge but of different colors and the differently colored conductors 20 are arranged in a particular sequence across the finished cable 24 to conform to a color code. Accordingly, the spools 18 are readily removable from the shafts 28 to permit changeover to conductors of different gauges and to permit arrangement of spools 18 in the desired colored sequence.

When the desired number of spools 18 has been mounted in rack 16 in the desired color code sequence, the free end of each conductor 20 is threaded in this color sequence through the straightening and guide means 12, best seen in FIGURES 2, 3 and 5. Referring first to FIGURE 1, it will be seen that the base 10 is provided with a table surface 30 that has a transversely extending upright wall 32 at the input end thereof. A guide bar 34 is rigidly affixed to the upper end of the wall 32 and is provided with a plurality of holes 36 through which the free end of conductors 20 are first passed. As is clearly shown in FIGURE 1, the conductors 20 from different levels of spools 18 are thus brought into approximately the same horizontal plane.

Towards the output end of the base 10 the table surface 30 is provided with a pair of longitudinally extending opposite side walls 38, each of which has rigidly affixed thereto an elongate member 40 that inclines rearwardly from and upwardly along the upper edges of the side walls 38. A transversely extending guide bar 42 is rigidly mounted on the rear ends of the members 40 and on its upper surface is provided with a plurality of eye hooks 44. It will be noted that the hooks 44 have open eyes, i.e. the looped part of the hook is helically expanded in order to permit easy insertion of the cables 20 therein.

In order to remove any bending stresses which may be present in the conductors 20 after having been wound on spools 18, each conductor is next passed through a wire straightening device. This device preferably takes the form shown in FIGURE 5 wherein the members 40 have rigidly affixed thereto a transversely extending support 46 that is generally U-shaped in cross-section. The support 46 is formed with a longitudinally extending slot 48 in which an elongated slide member 50 is disposed. Each of the side walls of the support 46 on its upper face is provided with a row of equally spaced apart enlarged-head screws 52 and row of similar screws 52 is mounted on the upper face of the slide 50. A strap 54 is rigidly affixed to one end of the support 46 across the opening of the slot 48 and is provided with a central tapped opening to receive the threaded stem of a bolt 56 that is provided with a butterfly head. The inner end of the bolt 56 abuts a cap 58 affixed on an end of the slide 50.

With this arrangement, after the conductors 20 have been threaded through the screws 52 the slide 50 can be adjusted to any desired degree by appropriate rotation of the bolt 56, which causes the screws 52 carried by the slide 50 to be offset from screws 52 carried by the support 46. In this manner, the force of the bending stress of the wire straightening device can be adjusted to any desired degree. Thus as the conductors 20 are pulled through the straightening device they follow the irregular path illustrated in FIGURE 3, and any latent bending stress in the conductors 20 is removed.

An alternate form of straightening device is shown in FIGURE 8. In this form a support 46' is provided with a plurality of passages 60, each of which is adapted to receive one of the conductors 20 therethrough. As FIGURE 8 shows, the passage 60 has four free rotatably mounted pulleys 62 therein. One of the pulleys 62 is mounted on a side wall 64 of passage 60 and parallel to said side wall while the other three pulleys 62 are mounted on the floor 66 of passage 60 and parallel thereto. The pulleys 62 are arranged so that they are tangentially aligned. The conductor 20 thus passes over the vertically disposed pulley 62 to change direction 180 degrees and thence passes to the rearmost pulley 62 on the passage floor 66. The conductor 20 once again changes direction substantially 180 degrees and then passes through the other two pulleys 62, each of which alters the direction of the conductor by 90 degrees. With this arrangement, the conductor 20 undergoes corrective stresses in at least three directions, and as is apparent, additional pulleys 62 could be added to apply corrective stresses in at least four different directions on the conductor 20.

After passing through the straightening device, the conductors are next threaded through a gathering element 68 which guides the conductors 20 laterally inward to the desired cable width. The gathering element 68 extends transversely across the opposite side walls 38 and has extending along its forward edge an upstanding flange or wall 70. Referring now to FIGURE 5, it will be seen that a plurality of apertures 72 is formed in the wall 70, said apertures being offset from one another in such a way that conductors 20 passing therethrough are vertically offset but laterally immediately adjacent one another. Thus, after passing through the gathering element 68 all of the conductors 20 will occupy a lateral width which is equal to the width of the completed cable.

In order to guide the laterally confined conductors 20 into substantially the same horizontal plane, the conductors are next passed through a banding device. As can be seen in FIGURES 2 and 3, a plurality of laterally spaced rods 74 extend transversely between the side walls 38 adjacent to the output end of the base 10. These rods 74 occupy substantially the same horizontal plane and the conductors 20 are threaded over and under said rods in sequence. A roller 76 is rotatably mounted between the side walls 38 in advance of the first rod 74, and referring specifically to FIGURE 2, it will be observed that the cylindrical surface of the roller 78 is upwardly offset relative to an imaginary straight line drawn between the lower surface of the first rod 74 and the point of departure of the conductors 20 from the gathering element 68. The conductors 20 are thus snugly pressed against the first rod 74 and the conductors thereby are subjected to a substantially uniform tension in passing through the rods 74. Additionally, the roller 78 prevents crossing of the conductors 20 as they enter the lateral guide elements, presently to be described.

In passing over and under the rods 74 the conductors 20 are laterally confined between elongate guides 78 and 79 that are formed with a plurality of holes adapted to register with the rods 74 in such a way that the guides 78 and 79 are laterally movably mounted on the rods 74. An abutment member 80 is similarly mounted on at least two of the rods 74 in a position parallel to the guide 78 and on the opposite side from guide 79. A pair of set screws 82 are carried on the abutment member 80 to releasably engage guide rods 74. A pair of compression springs 84 are coiled around two of the rods 74 between the abutment member 80 and the guide 78. As will be apparent, the abutment member 80 can be moved to any desired position to achieve sufficient pressure against the guide 78 for holding the conductors 20 into a desired lateral width against the guide 79 and adjacent wall 38 during their passage over the rods 74. Additionally, the resilient mounting of the guide 78 permits it to be substantially self aligning. As the laterally confined and banded conductors 20 leave the rods 74 in contiguous alignment they pass over another roller 86, which is rotatably mounted between the side walls 38, before entry into the solvent applying means 14.

The solvent applying means 14 includes an open-mouthed tank 88 which is mounted between the side walls 38 and the output end of base 10. The tank 88 contains a quantity of THF and is provided with an overflow outlet 90 which leads to a reservoir (not shown). The tank 88 is also preferably provided with inlet means (not shown) and a constant circulation of THF takes place in tank 88 in order to maintain the level of the solvent at a predetermined height above the bottom of the tank.

The conductors 20, as they leave the roller 86 in flat band form, are guided into the THF by means which are best seen in FIGURES 2 and 4 and that are adapted to permit removal of the conductors 20 from the solvent bath at will. Referring now to FIGURE 4, a substantially rectangular gate 92 will be seen to extend transversely between side walls 38. Along its upper edge the gate 92 is provided with a handle 94 for manual lifting and lowering of the gate. The opposite vertical edges of the gate 92 are slidably mounted in vertically extending slots 96 defined on the inner faces of the opposite side walls 38 (FIGURE 3).

In order to support the gate 92 at a predetermined elevation, the opposite vertical edges thereof are formed with shoulders 98 adapted to rest on abutment means 100 on the side walls 38. When the gate 92 is supported in this position, a transversely extending roller 102 carried along the bottom edge of gate 92 is disposed in the solvent bath so that the conductors 20 will pass around the lower surface of the roller 102 to be subected to the action of the THF. In order to prevent lifting of the gate 92 in response to the pressure of the conductors passing under the roller 102, an elongate lock pin 104 is removably inserted between aligned holes formed in the opposite side walls 38. A transversely extending lug 106 formed on the rear face of the gate 102 abuts the underside of the lock pin 104 to hold the gate 92 in its operating position.

Referring now to FIGURE 4, it will be seen that the roller 102 is rotatably supported at opposite ends thereof by arms 108 extending downwardly from gate 92. At their lower ends and spaced downwardly from he roller 102, the arms 108 support a rod 103 therebetween. The spacing between the roller 102 and the rod 103 is such that the conductors 20 pass under and against the roller 102 but do not touch the rod 103. While the apparatus is in operation the conductors 20 are immersed in the THF. When it is desired to stop the apparatus, the lock pin 104 is removed and the gate 92 immediately raised. The conductors 20 are thus lifted out of the THF by the bar 103 so that their insulation will not deteriorate while the apparatus is stopped.

In order to laterally confine conductors 20 while they pass through the THF, the gate 92 has counterweight means to press the banded conductors against the right hand arm 108 (FIGURE 4). A longitudinally extending slot 110 is formed in the mid-portion of gate 92 in which a laterally adustably pivot pin 112 is inserted. An angular pressure plate 114 is pivotally carried by the pin 112 and extends downwardly therefrom to provide a flat surface 116 that confronts the aforementioned arm 108 to confine the conductors 20 therebetween. A shaft 118 protrudes sidewardly from the pressure plate 114 and carries an adustable counterweight 120 that is axially slidably mounted thereon. A set screw 122 mounted in the counterweight 120 permits adustment of the counterweight inwardly and outwardly from the pressure plate surface 116 to vary the force exerted laterally on the conductors 20 as they pass under roller 102.

The THF dries very quickly after the conductors 20 leave tank 88 and accordingly it is desirable to insure that the conductors are securely held in a flat band immediately upon being exposed to the atmosphere. For this purpose a guide block 123 is affixed to the output end of tank 88. The block 123 is preferably made of a material that will not deteriorate under the influence of THF such as metal or the plastic "Teflon," and has an inclined upper face 123 that corresponds to the path of the conductors 20 thereover and presses them into a flat band.

At its output end the base 10 has another roller 124 rotatably supported between the walls 38 under which the conductors 20 pass after leaving the solvent bath in the tank 88. The output end of the base 10 also supports a rigidly mounted transversely extending tube 126 which is connected to a source of air under pressure so that a stream of air, preferably warm, is directed onto the adjacent face of the conductors 20 as they leave the solvent bath and pass onto the drying assembly 22. Due to the lateral pressure exerted on the band of conductors 20 during the time they are immersed in the solvent bath an intimate tangential union of adjacent insulating surfaces takes place, and the solvent action results in such adjacent surfaces defining a chemically and physically integral mass.

As is shown in FIGURE 1, the drying assembly 22 is longitudinally aligned with the base 10 immediately adjacent to the output end of the base. A vertically disposed, relatively large diameter drying drum 130 is freely rotatably mounted on a rigid framework 132 at an elevated position above the floor. The peripheral surface of the drum 130 has a covering 134 (FIGURE 2) made of a sheet of beryllium copper against which the banded conductors 20 are laid. This material is very dense and thus is very well adapted to resist deterioration from the solvent. Moreover, it can be smoothly finished and will remain smooth over a long period of time and so provides a perfectly even bearing surface for conductors 20.

It will be observed from FIGURE 2 that the roller 124 at the output end of base 10 is located immediately adjacent to the surface of the drum 130 and spaced apart therefrom a distance approximately equal to the gauge of the insulated conductors. Accordingly, as the banded conductors 20 leave the solvent bath they are immediately transferred onto the drying drum 130. As will be apparent, the conductors 20 are uniformly tensioned and because of the large diameter of drum 130 they cannot be displaced relative to one another during drying.

After less than one complete revolution of the drying drum 130, all of the solvent will ordinarily have dried, or evaporated from the conductors 20 which will thereafter be permanently bonded together into the flat band cable 24. However, since only one side of the banded conductors 20 is exposed to the atmosphere while carried by the drum 130, it is desirable to provide other means for exposing both sides of the cable 24 to the atmosphere to make sure that no undried solvent remains on the cable when it is wound onto a takeup spool.

In order to support the cable 24 with both of its surfaces exposed to the atmosphere for drying, the assembly 22 includes a pair of smaller drums 136 in substantially the same vertical plane with the drying drum 130. Both of the drums 136 are preferably provided with an elastomeric rim covering 138, e.g. made of rubber, so they will not exert any abrading action on the cable insulation. The drum 136 is freely rotatably mounted in the base 10 and receives the dried side of the cable 24 after it has travelled through at least 180 degrees on the large drum 130. The small drum 138 is freely rotatably mounted on the frame 132 at the opposite end thereof from the drum 136 and at substantially the same level. Thus, the cable 24 after passing approximately half way around the drum 136 is passed onto the drum 138 and then is threaded through the windup and pulling assembly 26 presently to be described. With this arrangement the cable 24 is supported for at least a portion of its travel with both sides of the cable exposed to the atmosphere for drying.

The windup and pulling mechanism 26 is supported by a framework 139 that includes pairs of vertically extending and laterally spaced apart corner posts 140 at opposite ends thereof. A horizontally disposed platform 142 extends between the two pairs of corner posts 140 and has rigidly mounted thereon a variable speed motor 144 that is drivingly connected to a reduction gear box 146.

At the end of the windup and pulling mechanism 26 that is adjacent to the drying assembly 22, the corner posts 140 support a transversely extending shaft 148 therebetween. A drive wheel 150 is freely rotatably mounted on the shaft 148 and has rigidly and concentrically affixed thereto a pulley 152 that is drivingly connected to a drive pulley 154 of the gear box 146 by an endless V-belt 156. An L-shaped clutch member 158 is pivotally mounted adjacent to the V-belt 156 on a framework bracket 159 and has a roller 160 at one end thereof. Spring means (not shown) are provided in connection with the handle portion of the clutch 158 that bias the clutch wheel 160 against the V-belt 156 to tighten it for driving connection between the pulleys 152 and 154. The clutch 158 is released by raising the handle thereof to allow the V-belt 156 to run slack.

Another shaft 162 is mounted horizontally between the corner posts 140 above the first mentioned shaft 148. Each end of the shaft 162 is connected to the midpoint of an arm 164 that is mounted for pivotal movement about the axis of the shaft. A freely rotatable wheel 166 is mounted between the upper ends of the arms 164 and a second freely rotatable wheel 168 is mounted between the lower ends of the arms 164.

At their upper ends the corner posts 140 are connected to top rails 170 on which an inspection lamp 172 is disposed. At the opposite end of top rail 170 from the upper wheel 166 is a takeup reel 174 that is adapted to receive the completed band 24. This reel in the case of wide bands 24 will be of the same width as the band. In the case of narrow cables the windup reel 174 will be adapted for winding in the manner of single wires. Just in advance of the reel 174 is a conventional level winding mechanism 176 that is adapted to guide narrow bands 24 laterally across the reel 174. The reel 174 is drivingly coupled to the motor 144 by a belt drive (not shown) that has belt tensioning means associated therewith to adjust the tension of cable 24 as it is pulled from the upper wheel.

The drive wheel 150 and the wheels 166 and 168 are each provided with an elastomeric rim covering 178 so that they will not exert any abrasive action on the band 24 as it passes over these wheels. The coverings 178 of the drive wheel 150 and of the lower wheel 168 are also important in insuring that a uniform tension is applied to all of the conductors 20 of a cable 24 as it is drawn through the apparatus. Thus, although all of the conductors 20 are ostensibly of exactly the same diameter it may be found that some of them are of slightly larger diameter than the balance of the conductors in a band 24. With the present arrangement even though the conductors 20 are of slightly different diameter all of them will nevertheless be cushioned or resiliently received between the elastomeric coverings 178 of the drive wheel 150 and the lower wheel 168 whereby all of the conductors 20 will be subjected to substantially the same tension.

As will now be apparent the cable 24 is pulled through the apparatus primarily by the drive wheel 150, while the cable 24 is subjected to tension beyond the wheel 150 by the action of the windup reel 174. As has been noted, the driving or pulling force of the takeup reel 174 can be adjusted by belt tensioning means for the drive belt associated with the reel 174. With this arrangement, adjustment of the driving force of the takeup reel 174 will permit variation in the pulling force of the drive wheel 150. If the tension on the cable 24 between the reel 174 and the upper wheel 166 is increased, the wheel supporting arms 164 tend to move in a counterclockwise direction as viewed in FIGURE 1, thus increasing the force with which the lower wheel 168 presses against the drive wheel 150. This arrangement is particularly useful in adjusting the apparatus for different gauges of conductors.

A view of the finished flat band cable 24 is shown in FIGURE 6. In many of the uses of cable of this type it is desirable that adjacent conductors 20 be joined together throughout their lengths so that no voids will appear therebetween. Referring now to FIGURE 1 it will be seen that the inspection lamp 172 is disposed in alignment with the path of travel of the cable 24. Thus as the completed cable 24 passes over the lamp 172 the cable can be visually checked for the presence of undesirable voids between adjacent conductors which will be indicated by flashes of light through such voids in the cable.

In beginning a production run of cable, individual conductors 20 of the desired gauge are arranged in the proper color sequence and are first threaded through the wire guide and straightening means 12 and after banding, by weaving through the guides 78 and 79, short lengths thereof are pulled beyond the roller 86. The protruding free ends of the conductors 20 are then joined together by applying THF thereto with a brush or the like and after drying, the free end of the joined conductors 20 is then passed under the roller 102 of the gate 92 while the gate is in lifted position. The ends of conductors 20 are then passed under the roller 124 and placed onto the drum 134. At this point the conductor ends are attached to any suitable flat clamp which is connected to one end of a long strap which has previously been threaded through the drying assembly 22 and the windup and pulling mechanism 26. The motor 144 can then be energized and gate 92 lowered into operating position and the apparatus is then run continuously until the end of cable 29 can be fastened to the winding reel 174 and the lead strap removed. Continued operation of the apparatus will result in winding up on reel 174 of cable 24. As will be apparent any suitable counting device can be connected at any convenient point along the travel of the cable 24 to indicate the length of completed cable.

When the desired length of cable 24 has been formed the motor 144 is stopped and gate 92 lifted to prevent deterioration of cable in the tank 88. The cut tail end of the cable can then be drawn through the remainder of the apparatus and guided for a portion of its travel around the drying drum 130 by hand. Inasmuch as the THF solvent dries very quickly upon exposure to the atmosphere, it will be found that the tail end of the completed cable need be supported only to insure proper winding up thereof rather than for the purpose of drying it.

While we have described a preferred method and means for producing multi-conductor cable, it will be readily apparent that substantial modifications and changes may be made that lie within the scope of our invention. Hence, we do not wish to be limited by the foregoing description but only by the scope of the appended claims.

We claim:

1. A method of making coated multi-conductor cable, which includes the steps of: aligning at least two polyvinylchloride coated conductors in side-by-side relationship; and applying tetrahydrofuran to the conductors, said tetrahydrofuran material having a solvent effect on the coating of the coated conductors to thereby fuse the conductors into a multi-conductor cable.

2. A method of continuously making polyvinylchloride coated multi-conductor cable, which includes the steps of: aligning individual polyvinylchloride coated conductors in contacting side-by-side relationship; maintaining the conductors under tension; passing the aligned and tensioned conductors into a solvent having a solvent action on said polyvinylchloride coating composition; and exposing the conductors to the solvent action of tetrahydrofuran for a predetermined period of time sufficiently brief to cause a peel-off bonding of adjacent conductors to occur.

3. The method of claim 2 wherein said polyvinylchloride coating comprises from 25 to 60 percent polyvinylchloride resin and said solvent comprises substantially all tetrahydrofuran.

4. The method of claim 2 wherein said polyvinylchloride coating comprises from 25–40 percent polyvinylchloride resin, and said solvent comprises from $\frac{1}{10}$–3 percent of polyvinylchloride resin and the remainder tetrahydrofuran.

5. The method of claim 3 wherein the time of exposure of said conductors to said solvent lies between 0.45 second and 1.0 second.

6. A method of continuously making polyvinylchloride coated multi-conductor cable, which comprises: contiguously aligning individual polyvinylchloride coated conductors; maintaining said conductors under tension; passing the aligned and tensioned conductors into a solvent which comprises substantially entirely tetrahydrofuran, said solvent being maintained at a temperature substantially below its boiling point and at substantially atmospheric pressure; exposing the conductors to the solvent action of said solvent for from 0.45 to 1.0 second whereby an approximately tangential fusion of adjacent conductors is created; and evaporating said solvent on said conductors by application of heat.

References Cited in the file of this patent

UNITED STATES PATENTS

| | | |
|---|---|---|
| 2,242,022 | Blount et al. | May 13, 1941 |
| 2,425,294 | Morgan | Aug. 12, 1947 |
| 2,444,469 | Price | July 6, 1948 |
| 2,617,777 | Heisenberg | Nov. 11, 1952 |
| 2,658,014 | Morrison | Nov. 3, 1953 |
| 2,678,676 | Slovin | May 18, 1954 |
| 2,749,261 | Hardison | June 5, 1956 |
| 2,787,567 | Fisher | Apr. 2, 1957 |
| 2,814,581 | Flynn | Nov. 26, 1957 |
| 2,828,234 | Hengel | Mar. 25, 1958 |